United States Patent [19]
Horton

[11] Patent Number: 5,969,770
[45] Date of Patent: Oct. 19, 1999

[54] ANIMATED "ON-SCREEN" DISPLAY PROVISIONS FOR AN MPEG VIDEO SIGNAL PROCESSING SYSTEM

[75] Inventor: Raymond Scott Horton, McKinney, Tex.

[73] Assignee: Thomson Consumer Electronics, Inc., Indianapolis, Ind.

[21] Appl. No.: 08/952,553

[22] PCT Filed: May 17, 1996

[86] PCT No.: PCT/US96/07128

§ 371 Date: Nov. 21, 1997

§ 102(e) Date: Nov. 21, 1997

[87] PCT Pub. No.: WO96/38008

PCT Pub. Date: Nov. 28, 1996

[30] Foreign Application Priority Data

May 24, 1995 [GB] United Kingdom ............... 9510507

[51] Int. Cl.⁶ ........................................... H04N 5/50
[52] U.S. Cl. ................................... 348/569; 370/477
[58] Field of Search ..................................... 348/553, 563, 348/569, 589, 584, 598, 599, 600, 601

[56] References Cited

U.S. PATENT DOCUMENTS 5,489,947  2/1996  Cooper .................................. 348/589
5,534,942  7/1996  Beyers et al. ........................ 348/569

FOREIGN PATENT DOCUMENTS 0568356  of 0000  European Pat. Off. .
0597616  of 0000  European Pat. Off. .
0601647  of 0000  European Pat. Off. .
0660609  of 0000  European Pat. Off. .
95/35625 of 0000  WIPO .

OTHER PUBLICATIONS

IEEE Transactions on Consumer Electronics, vol. 39., No. 4. Nov. 1993, LEI, ETAL "A New Architecture for a TV Graphics Animation Module", pp. 795–800.

*Primary Examiner*—Andrew I. Faile
*Assistant Examiner*—Uyen Le
*Attorney, Agent, or Firm*—Joseph S. Tripoli; Peter M. Emanuel

[57] ABSTRACT

A digital television system which processes television information in the form of a stream data packets representing video and audio information in compressed form, such as MPEG, includes on-screen display (OSD) provisions for displaying sophisticated graphics, such as animation, by storing graphics data in a read only memory (ROM) in the same compressed form as that used for the video information. The graphics data is transported to the same video decoding and decompression unit which processes the video data contained in the video packets to form digital signals representing video information in uncompressed form, where it is converted in the same manner as the video data to form graphic image data. A multiplexing arrangement is provided so that digital signals representing animation graphics can be multiplexed with digital signals representing static graphics image data derived from bit-mapped representations.

13 Claims, 3 Drawing Sheets

ANIMATED "ON-SCREEN" DISPLAY PROVISIONS FOR AN MPEG VIDEO SIGNAL PROCESSING SYSTEM

FIELD OF THE INVENTION

The invention concerns "on-screen" display provisions for a video signal processing system, such as a digital television system, which processes video information which has been compressed in accordance with a digital compression standard such as MPEG.

BACKGROUND OF THE INVENTION

Modern consumer electronics products such television receivers, video cassette recorders (VCRs) and video disk players typically include so called "on-screen" display ("OSD") provisions for displaying status information and instructions in the form of textual (alphanumeric) and pictorial graphics on the screen of a display device which is normally used to display video information. Early OSD systems were only capable of displaying a limited amount of status information, such as the channel or program number of the program currently being viewed and the current time. Later OSD systems were capable of displaying instructional information for guiding a user in making adjustments such as setting the contrast and brightness of a television receiver or setting the recording times and channel numbers of programs to be recorded in the future by a VCR.

In a typical OSD system, the OSD graphics information is stored in a memory in what is known as a "bit-mapped" form. A "bit-map" is a rectangular array of picture elements ("pixels") which defines the shape of the graphics to be displayed. Each memory location of the bit-map memory contains a code word for a respective graphics pixel. The code word defines the intensity level or color of the graphics pixel. For textual information, each of the code words may simply comprise a single bit designating the presence (e.g., by logic "1" level) or the absence (e.g., by logic "0" level) of a pixel with a particular intensity level (e.g., white) or color. For pictorial graphics, each of the code words may represent any one of a plurality of colors. For example, a four-bit code word can represent 16 (24) different colors. The color information for each pixel is stored in a memory called a "color palette", and the code words are used to address the color palette memory. In other words, the color palette memory is used as a "look-up" table for the colors of the graphics pixels.

Some very recent OSD system are capable of displaying very sophisticated graphics including limited animated graphics. Animation, involves the sequencing of graphical information in such a way as to produce the effect of motion. The known technique for providing OSD animation in a consumer product involves storing a series of bit-mapped graphical images and reading individual ones of the stored bit-mapped graphic images out of the memory in the appropriate sequence, usually under microprocessor control. Depending on the size of the display area being animated, the amount of memory required to store the series of bit-mapped graphic images may be very substantial. In addition, the microprocessor workload required to read-out and manipulate the bit-mapped graphic images is very high. The memory and microprocessor requirements can make a high quality animation feature very expensive, especially for use in consumer products In the article "A New Architecture for a TV Graphics Animation Module", IEEE Transactions on Consumer Electronics, 39(1993), No. 4 (November), the authors describe a TV graphics animation player/edit system using a workstation which can receive an analog video signal, and a digital signal representing graphicaldata. Real time compression is applied to both, and they arc stored in a disk memory. Data is then read from the disk memory, decompressed in real time, and displayed on a monitor.

European patent publication O 597 616, published May 18, 1994, discloses a system for mixing animation sequences with computer graphics information, also for display on a computer display screen. The animation sequences are stored in compressed format. The compressed animation sequences are then retrieved from storage, decompressed, synchronized with the computer graphics information and sent to a computer monitor.

European patent publication O 660 609, published Jun. 28, 1995, discloses a system in which the MPEG encoding method is used to encode an I frame with a background image, and various P frames, each encoding the chances to the background image I frame necessary to make a menu or other user window-like control, such as a drop-down list or button. These frames are transmitted from a central location, such as a cable head end, to a receiver location to provide a user with a graphical interface to interact with the central location.

European patent publication O 601 647, published Jun. 15, 1994, discloses a system in which video data is stored in an internal format. Input encoders receive video signals in various formats, and convert the video signal from that format to the internal format. Output decoders retreive internal format video data and convert it to respective output formats. A multiplexer couples one of the output decoders to the display device.

SUMMARY OF THE INVENTION

The present invention resides in part in the recognition that apparatus for providing sophisticated OSD graphics, such as animation, may be added with little extra cost or complexity in a digital video signal processing system of the type which processes television information in the form of a stream of digital packets representing video and audio information in compressed form, for example, according to the MPEG standard. According to the present invention, instead of storing graphics bitmapped form, the graphics is stored in compressed form according to the same video compression standard, e.g., MPEG, which is used for the video information. The invention is particularly useful for providing animation graphics. The amount of memory required to store compressed animation is significantly lower than that required to store the same animation in bit-mapped form. In addition, the microprocessor workload for processing compressed animation is significantly lower than that required for processing the same animation in bit-mapped form.

More specifically, the invention is directed to an OSD arrangement for a digital video signal processing system of the type which processes video information in the form of a stream of packets representing video and audio information in compressed form, including a demultiplexer (sometimes referred to as a transport unit) which directs the payload data of the packets to respective decoding and decompression units of a digital signal processing section according to header information contained in the packets. According to an aspect of the invention, the OSD arrangement comprises a memory for storing OSD graphics data representing OSD graphics information in the same compressed form as that used for the video information, and a controller for selectively directing the OSD graphics data to the transport unit when it is desired to display the OSD graphics. The OSD graphics data will be routed by the transport unit to the video decoding and decompression unit which will decode and decompress the graphics data in the same manner as it does the video data, resulting in the generation of digital signals representing the graphics and the ultimate display of the OSD graphics. Advantageously, the OSD graphics data may correspond to animation.

In accordance with another feature of the invention, the OSD arrangement further includes provisions for storing data representing "static" OSD graphics, such as textual or pictorial graphics, in bit-mapped form. The bit-mapped based static graphics data is coupled to the digital signal processing section where they are converted, advantageously in the video decoding and decompression unit, to digital video signals representing the static graphics. The static graphics representative digital video signals are multiplexed with the animation graphics representative digital signals derived from compression based animation graphics data, resulting in a combination of the static graphics and the animation graphics.

These and other aspects of the invention will be described with respect to the accompanying Drawing.

DETAILED DESCRIPTION OF THE DRAWING

The invention will be described with reference to a digital satellite television system in which television information is compressed and encoded in accordance with what has become known as the MPEG protocol or standard. MPEG is an international standard for the coded representation of moving pictures and associated audio information developed by the Motion Pictures Expert Group. More specifically, prior to transmission, analog video and audio signals are converted to respective digital signals. The digital video and audio signals are compressed to remove redundant information in order to reduce the transmission bandwidth and the resultant digital signals are formatted into a stream of audio and video packets. Each packet includes a "payload" portion including either video or audio data and a packet "header" code which identifies the type of information represented by the payload portion of the packet. Packets corresponding to control and other data are also added the packet stream. Forward error correction (FEC) data is added to the packets in order make the correction of errors due to noise within the transmission path possible. The well known Viterbi and Reed-Solomon types of forward error correction coding may both be advantageously employed. The digital data resulting from the compression, formatting and error correction operations is modulated onto a carrier in what is known in the digital transmission field as QPSK (Quaternary Phase Shift Keying) modulation.

Figure 1:
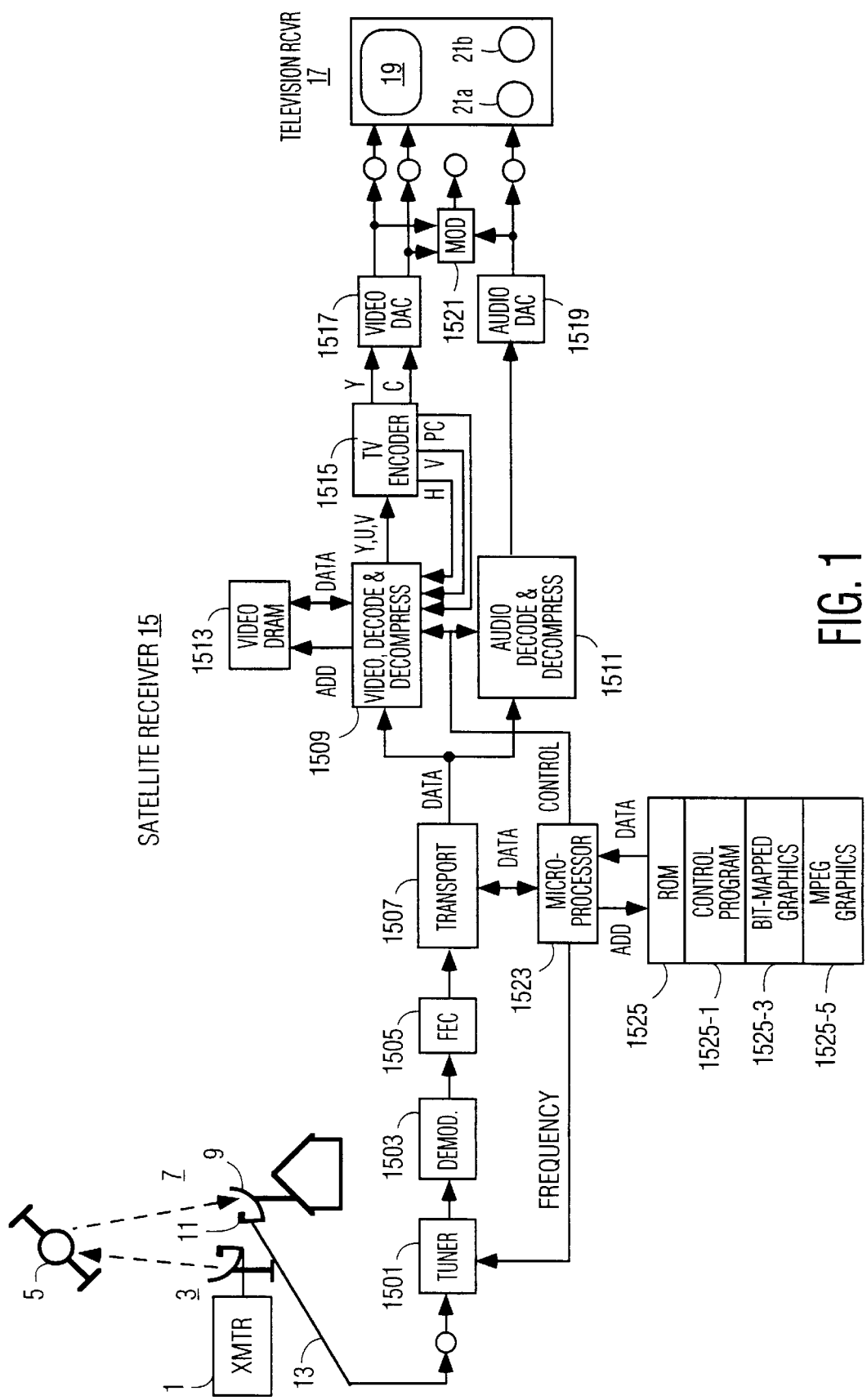
FIG. 1 is a block diagram of a digital satellite television system which processes compressed and digitally encoded video signals and which includes an OSD arrangement constructed in accordance with the invention.

In the digital satellite television system shown in FIG. 1, a transmitter 1, with an associated transmitting antenna 3, transmits the compressed and digitally encoded television signals to a satellite 5 in geosynchronous earth orbit. Satellite 5 receives the transmitted television signals and retransmits them to the earth. The retransmitted television signals are received by an antenna assembly or "outdoor unit" 7. Antenna assembly 7 includes a dish-like antenna 9 and a frequency converter 11. Antenna 9 directs the received television signals to frequency converter 11. Frequency converter 11 converts the frequencies of the received television signals to respective lower frequencies.

The RF television signals produced by converter 11 are coupled via a coaxial cable 13 to a satellite television receiver 15. Satellite receiver 15 is sometimes referred to as an "indoor unit" because it is located indoors. Satellite receiver 15 tunes, demodulates, decodes, decompresses and otherwise processes the received television signals, as will be described in detail below, to produce analog video and "right" and "left" stereo audio signals with a format (e.g., NTSC, PAL or SECAM) suitable for processing by a conventional television receiver 17 to which they are coupled. Television receiver 17 produces an image on a display screen 19 in response to the video signal and "right" and "left" audible responses by means of speakers 21a and 21b in response to the "right" and "left" audio signals.

More specifically, satellite receiver 15 includes a tuner 1501 for selecting the RF signal corresponding to the program desired by a user form the plurality of RF signals received from antenna assembly 7 and for converting the frequency of the selected RF signal to a lower, intermediate frequency to produce an IF signal. The IF signal is demodulated by a QPSK demodulator 1503 to produce a demodulated digital signal. A forward error correction (FEC) unit 1505 corrects the data contained in the demodulated digital signal based on the FEC data inserted prior to transmission. For example, FEC unit 1505 may operate according to Viterbi and Reed-Solomon error correction algorithms. Tuner 1501, QPSK demodulator 1503 and FEC unit 1505 may be included in a single assembly available from Hughes Network Systems of Germantown, Mass. or from Comstream Corp., San Diego, Calif.

A transport unit 1507 is a demultiplexer which routes the payload data of the video packets of the error corrected digital signal produced by FEC unit 1505 to a video decoding and decompression unit 1509 and the payload data of the audio packets to an audio decoding and decompression unit 1511 via a data bus according to the header information contained in the packets. Video decoding and decompression unit 1509 cooperates with a random access memory (RAM) 1513, for example, in the form of a dynamic RAM (DRAM), to decode and decompress the video data to form a sequence of digital words representing respective luminance (Y) and color difference (U and V) components. The sequence of video component representative digital words is coupled to a television encoder 1515 which converts the component representative digital words to a sequence of digital words representing luminance (Y) information and a sequence of digital words representing chrominance (C) information in accordance with the line and field raster scanning format of a conventional television standard. Television signal encoder 1515 generates line (H) and field (V) rate signals and a picture element (pixel) clock signal (PC) which are coupled to video decoder 1509 to synchronize the generation of the component representative digital words. The luminance and chrominance representative digital words are converted to analog luminance and chrominance signals by respective sections of a digital-to-analog converter (DAC) 1517.

Audio decoding and decompression unit 1509 decodes and decompresses the audio payload data and the resultant digital audio signal is converted to baseband analog audio "right" and "left" signals by a DAC 1519. (Only a single audio channel is indicated in FIG. 1 for the sake of simplicity.)

The baseband analog video and audio signals are coupled to television receiver 17 via respective baseband connections. The baseband analog video and audio signals are also coupled to a modulator 1521 which modulates the analog signals on to a RF carrier in accordance with a conventional television standard for coupling to the antenna input of a television receiver without baseband inputs.

A microprocessor 1523 operates in response to a control program stored in a "read only" memory (ROM) 1525 to control various sections of satellite receiver 15. The control program is stored in a "control program" section 1525-1 of ROM 1525. Microprocessor 1523 provides frequency selection control data to tuner 1501 for controlling the operation of tuner 1501. Microprocessor 1523 also operates interactively with transport 1507 to control the routing of payload data. Microprocessor 1523 additionally provides control data to video decoding and decompression unit 1509 and audio decoding and decompression unit 1511 via a control bus.

Microprocessor 1523 also operates in conjunction with ROM 1525 for causing graphics images to be displayed on screen 19 of television receiver 21. The graphic images provide status information, operating instructions and, in general, guide a user in using satellite receiver 15. Two types of graphic images are caused to be displayed: static graphic images including alphanumeric characters or text and pictorial graphics; and animated graphic images. The data for both types of graphic images are stored in ROM 1525. The static graphic images are stored in "bit-mapped" form. However, to conserve on memory space, the animated graphic images are stored in the same compressed form, e.g., MPEG, as the payload data representing "live" or video images received from transmitter 1. The data for the bit-mapped graphics is stored in a "bit-mapped graphics" section 1525-3 of ROM 1525, and the data for the MPEG graphics is stored in a "MPEG graphics" section 1525-5 of ROM 1525.

For each of the bit-mapped OSD graphics images there is a "bit-map" and a "header" The bit-map defines the shape of the respective bit-mapped OSD graphics images on a pixel by pixel basis. More specifically, the bit-map is a rectangular array or grid having a "Y" coordinate corresponding to the vertical direction of screen 19 and a "X" coordinate corresponding to the horizontal direction of screen 19. Each grid location corresponds to a pixel and the color of each pixel is represented by a digital word "at" the respective grid location. The "header" contains a "color palette" which defines the color of each pixel of the respective bit-map. The digital words at the grid locations of a bit-map are used to address the color palette and thereby derive the color for the respective pixel in a "look-up" table manner. The same color palette may be associated with a plurality of bit-maps, depending on the nature of the graphics image to be displayed. The color palette is described in greater detail below. The header also contain data which defines the location of the corresponding OSD graphics image in terms of the vertical and horizontal position of the first pixel of the respective bit-map.

As stated above, for each pixel of the graphic image there is a digital word representing a color for that pixel. The number of bits contained in the color representative digital words determines how many different colors each pixel can have. By way of example, in the present embodiment, the color representative words contain two bits. Accordingly, each graphics pixel can have any one of four colors corresponding to the four possible binary states (00, 01, 10 and 11) of the two-bit color word. In the color palette, the pixel color information is organized in a component form in which for each color word there is a unique group of component representative digital words, as is shown in following table.

| color | group of components |
|---|---|
| 00 | $Y_A, U_A, V_A$ |
| 01 | $Y_B, U_B, V_B$ |
| 10 | $Y_C, U_C, V_C$ |
| 11 | $Y_D, U_D, V_D$ |

The components are selected to be the same as the components used for the transmission of video image information: namely, luminance (Y) and a pair of color difference components (U and V). The selection of the same components for video images and graphics images simplifies the OSD arrangement because it avoids the need for conversion from one set of components to another. The actual individual color (represented by the subscripts A, B, C or D in the table) of a graphics pixel depends on the value represented by component representative digital words of the respective group.

The bit-mapped graphics data is transferred to video decoder and decompression unit 1509 as control data via the control bus and is caused to be converted to image data in the manner to be described below with respect to FIG. 2. However, the MPEG graphics is transferred to video decoder and decompression unit 1509 via transport 1507 and the data bus and is converted to image data in the same manner as the received video data packets, which will also be described below with respect to FIG. 2. While the MPEG graphics image information is stored in ROM section 1525-5 in the same compressed form as the received video image payload information, it is stored without a packet header identifying it as image information.

Figure 2:
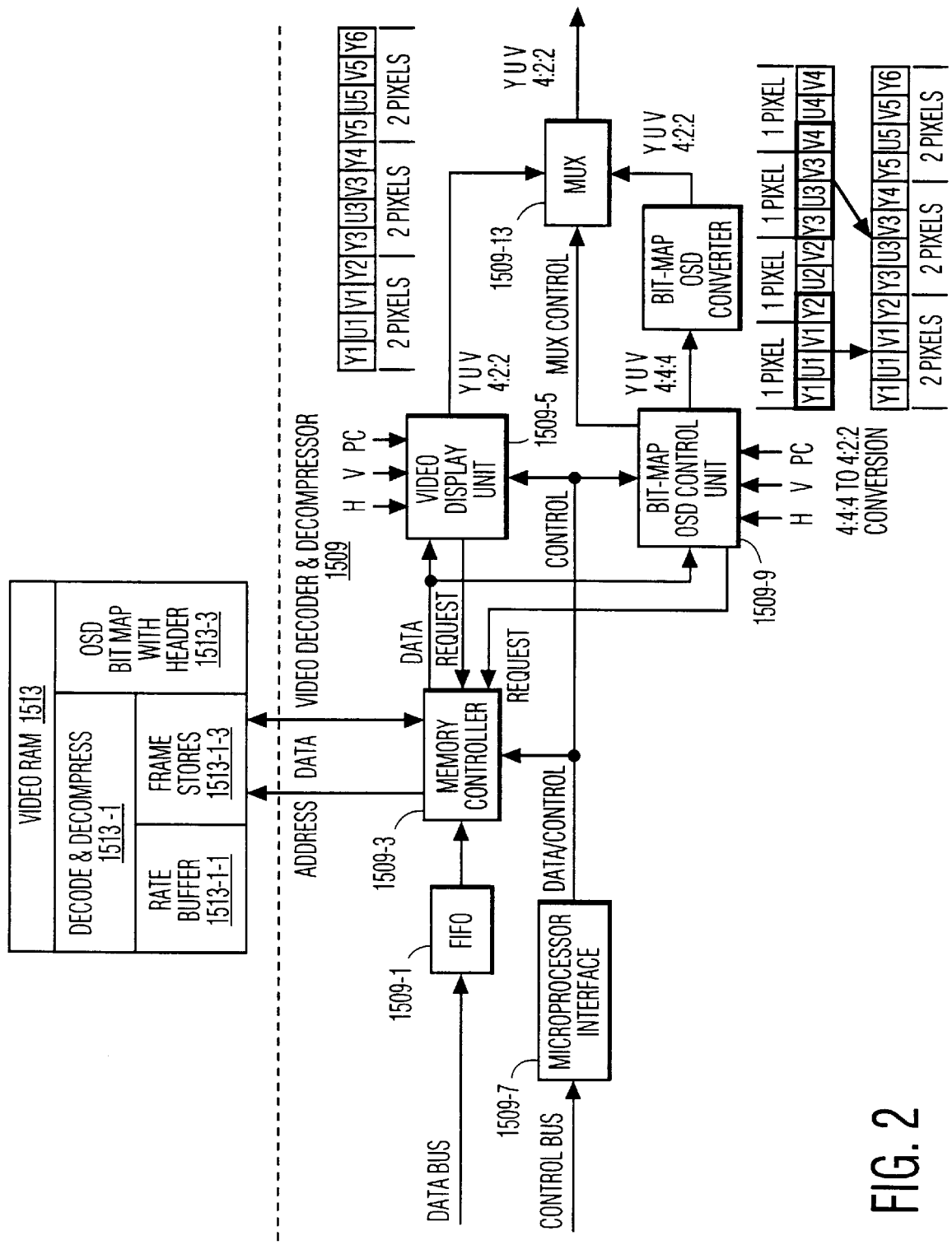
FIG. 2 is a block diagram of the video decoding and decompression unit of the digital satellite television system shown in FIG. 1.

Details of the portions of video decoding and decompressing unit 1509 are shown in FIG. 2. Video decoding and decompression unit 1509 includes a FIFO (first in, first out) buffer memory 1509-1 which receives video data on demand in relatively small segments from transport 1507 and which couples it in relatively larger segments via a memory controller 1509-3 to a section 1513-1 of video RAM 1513 reserved for decoding and decompression. Video RAM 1513 is addressed under the control of memory controller 1509-3. Decoding and decompression section 1513-1 of RAM 1513 includes a rate buffer section 1513-1-1 for storing the received video data and a frame store section 1513-1-3 for storing frames of video information during the decoding and decompression operation. A video image display unit 1509-5 decodes and decompresses the stored video data to form the video image component representative digital words (Y, U, V) coupled to television signal encoding unit 1515. For this purpose, video display unit 1509-5 requests data from decoding and decompression section 1513-1 of video RAM 1513 via memory controller 1509-3 as required. The generation of the component representative digital words is synchronized with the field (V), line (H) and pixel (PC) rate signals generated by television signal encoder 1515. Control data generated by microprocessor 1523 is received by a microprocessor interface unit 1509-7 and coupled to various portions of video decoding and decompression unit 1509 via an internal control bus.

The sequence of video image component representative digital words produced at the output of video decoding and decompression unit 1509 is organized in groups of components. In the present embodiment, each of the video image representative groups corresponds to two pixels. Each group includes a first luminance representative digital word corresponding to a first pixel, a second luminance representative digital word corresponding to a second pixel, and a single pair of color difference representative digital words corresponding to each of the first and second pixels. This has been referred to as a "4:2:2" format in the digital video signal processing field. The subsampling of the color difference signals relates to the image data compression which occurs prior to transmission for the purpose of reducing the transmission bandwidth. More specifically, the transmitted image data is organized in what is known as "4:2:0" format in which there are four luminance representative words corresponding to respective ones of four pixels and a single pair of color difference representative words corresponding to each of the four pixels. The 4:2:0 image representative groups are converted to 4:2:2 image representative groups by interpolation within video display unit 1509-5. A complete set (4:4:4) of components for each pixel is produced by interpolation within television signal encoder 1515.

Video decoding and decompression unit 1509 includes a bit-mapped OSD graphics section including a bit-mapped OSD control section 1509-9 and a bit-mapped OSD graphics image data converter for generating graphics image data from the bit-mapped graphics data stored in section 1525-3 of ROM 1525 (shown in FIG. 1). When it is desired to display bit-mapped OSD graphics, the bit-mapped graphics data stored in section 1525-3 of ROM 1525 is transferred to OSD section 1513-3 of RAM 1513 for storage via the control bus, microprocessor interface unit 1509-7 and memory controller 1509-3, under the control of microprocessor 1523. Bit-mapped OSD control unit 1509-9 causes the bit-map data to be read out from bit-mapped OSD section 1513-3 of RAM 1513 via memory controller 1509-3, and converts the color representative word for each pixel to the corresponding component representative group in accordance with color palette data contained in the associated header. The generation of the graphic image component representative digital words by bit-mapped OSD control unit 1509-9 is also synchronized with the field (V), line (H) and pixel (PC) rate signals generated by television signal encoder 1515.

As earlier noted, the video image component representative groups generated by video image display unit 1509-5 represent video image information in a subsampled form in which for every two pixels there are two respective luminance representative word and one pair of color difference representative words in a so-called 4:2:2 format. On the other hand, the bit-mapped OSD graphic image component representative groups generated by bit-mapped OSD control unit 1509-9 represent graphics image information in an unsubsampled or complete 4:4:4 form in which for every one pixel there is one luminance representative word and one pair of color difference representative words (or for every two pixels there are two respective luminance representative words and two respective pairs of color difference representative words). The 4:4:4 form is desirable for graphics since it allows as many colors as possible to be defined with a given number of bits because it provides for a unique luminance component and two unique color difference components for each pixel of graphics. However, the 4:4:4 graphic image sequence is not compatible with the 4:2:2 video image sequence and cannot be readily multiplexed with it to so as to insert a graphics image into a video image.

Figure 3:
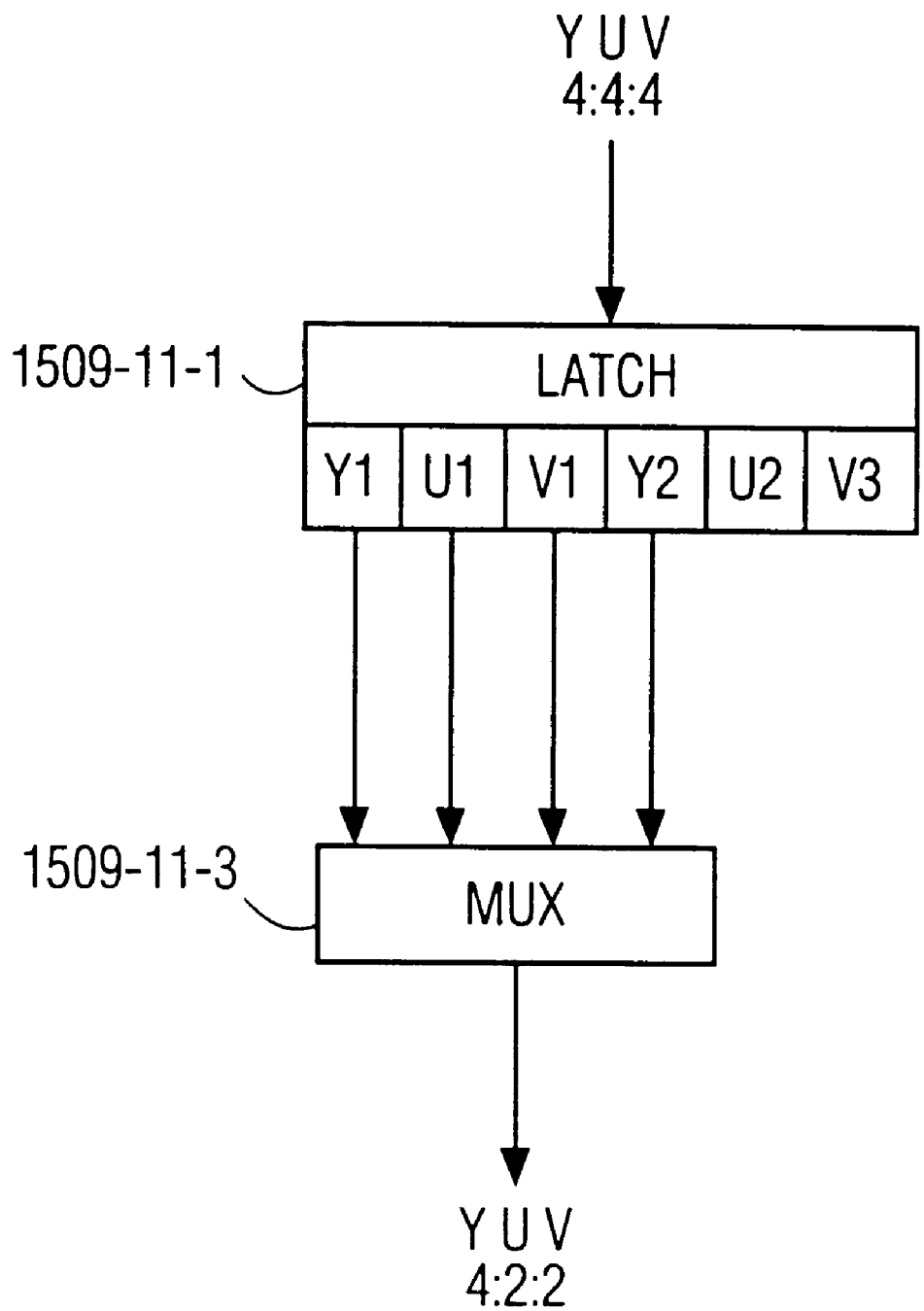
FIG. 3 is a block diagram of a format converter used in the video decoding and decompression unit shown in FIG. 2.

To solve this problem, video decoder and decompression unit 1509 includes bit-mapped OSD graphics image data converter 1509-11 for converting the 4:4:4 sequence used for the graphic image components to the 4:2:2 sequence used for the video image components. As is pictorially indicated in FIG. 2, for every two graphics pixels, converter 1509-11 selects the pair of color difference components for the first pixel and deletes the pair for the second pixel. As shown in as shown in FIG. 3, bit-mapped converter 1509-11 may comprise a latch 1509-11-1 for storing two groups of graphic image component representative words, and a multiplexer 1509-11-3 which selects the appropriate component representative words in sequence from those stored in latch 1509-11-1 at the output rate. It is desirable that the number of 4:4:4 groups of graphic image representative components per line be an even number because two of the original 4:4:4 graphic image groups are used to produce each new one of the 4:2:2 graphic image groups.

An output multiplexer 1509-13 selects either groups of video image component representative words provided by video image display unit 1509-5 or groups of graphic image component representative words provided by bit-mapped OSD graphics image data converter 1509-11 in response to a multiplex control signal generated by bit-mapped OSD control unit 1509-9. In a video image only mode of operation, output multiplexer 1509-13 selects only the video image groups. In a graphic image only mode of operation, output multiplexer 1509-13 selects only the graphic image groups. In a "superimpose" or "overlay" mode of operation, in which the graphic image is inserted within a video image, output multiplexer 1509-13 selects either the video image groups or the graphic image groups on a pixel by pixel basis. The 4:2:2 output sequence of component representative words produced by output multiplexer 1509-13 is coupled to television signal encoder 1515.

When it is desired to display MPEG graphics, such as animation, the MPEG graphics data stored in section 1525-5 of ROM 1525 is transferred to rate buffer section 1513-1-1 of RAM 1513 via transport unit 1507 and the data bus (shown in FIG. 1), FIFO 1509-1 unit 1509-7 and memory controller 1509-3, under the control of microprocessor 1523. The MPEG graphics data may be transferred in segments, depending on the amount of the data. Thereafter, the MPEG graphics data is decoded and decompressed by video display unit 1509-5 in the same manner as MPEG video data to produce 4:2:2 graphics image representative groups of components, resulting in the eventual display of the MPEG based graphics. In order to provide for more flexibility, the bit-mapped based graphics may be combined with MPEG based graphics due to the "superimpose" mode of operation of output multiplexer 1509-13 in the same manner that bit-mapped based graphics is combined with a video image.

Desirably video decoding and decompression unit 1509 is incorporated in a single integrated circuit (IC). Similar video decoding and decompression ICs, with the exception of the OSD provisions described above, are commercially available. For example, a MPEG decoding and decompression IC, identified by part number ST3240, is available from SGS Thomson, of France.

Thus, what has been described is an OSD apparatus and method for use in a digital video signal processing system which receives, decodes and decompresses compressed video information, involving the means for and steps of retrieving stored graphics information which has been compressed in the same manner as the video information and coupling it to the decoding and decompression section of the digital video signal processing system, where it is decoded and decompressed in the same manner as the compressed video information. As earlier noted, this allows the production of highly sophisticated graphics including animation without excessive memory requirements and controller workload demands compared with bit-map OSD techniques. In addition to the possibility of more detailed static graphics and animation with more motion, the disclosed apparatus and method provides for the possibility of more color resolution.

While the present invention has been described in terms of a specific embodiment, it will be appreciated that modifications may be made. For example, while the invention has been described with respect to a satellite television system, it may be employed in other types of digital video processing systems which receive and process video information in compressed form. In this regard, the invention may be used in a digital video processing system which receives compressed video information from a playback device, as well as in a digital video processing system which received compressed video information from a transmitting site. Further, the invention may be employed in so called "video cards" utilized in a computer to process video information. Even further, while the invention has been described in terms of an embodiment in which the OSD graphics data is stored in a memory within the system, the graphics data may be received ("downloaded") from an external source. In addition, while the invention has been described with respect to a system which receives video information which is compressed and encoded according to the MPEG standard, it is also applicable to systems which receive and process video information compressed and encoded according to other standards. Also, it is contemplated that there may be modifications to the system architecture, such as those involving the partitioning of functional sections, signal routing and the allocation of memory space. In addition, while the invention has been described in terms of a hardware implementation, it is equally applicable to software implementations in which various functions, such as the decoding and decompression are performed, by software. These and other modifications are contemplated to be within the scope of the invention defined by the following claims.

I claim:

1. A system for processing a received stream of packets representing television video and audio information which has been compressed and digitally encoded, each of said packets including payload data representing a particular type of information and a header which identifies the particular type of information represented by the payload data, comprising:

means for decompressing payload data representing television video information to produce digital signals representing decompressed video information;

means for decompressing payload data representing television audio information to produce digital signals representing decompressed audio information;

means for routing payload data of said packets of said stream of packets to ones of said decompressing means according to the respective headers contained in said packets;

means for storing data representing on-screen display graphics information which has been compressed in the same manner as the received television video information; and means for selectively coupling said data representing on-screen display graphics information which has been compressed from said storing means to said routing means so that said data representing said on-screen display graphics information which has been compressed is thereafter routed by said routing means to said video decompressing means where it is decompressed to form digital signals representing on-screen display graphics information derived from said compressed on-screen display graphics data.

2. The system recited in claim 1, further including:

means for storing data representing additional on-screen display graphics information but which has not been compressed in the same manner as said received video information;

means for converting said data representing said additional on-screen display graphics information to digital signals representing said additional on-screen display graphics information;

means for selectively coupling said data representing said additional on-screen display graphics information; and means coupled to said video decompressing means and to said converting means for combining said digital signals representing decompressed video information and said digital signals representing said additional on-screen display graphics information.

3. The system recited in claim 2, wherein:

said data representing on-screen display graphics information which has been compressed and said data representing said additional on-screen display graphics information but which has not been compressed are caused to be contemporaneously coupled to said video decompressing means and said converting means, respectively, so that said digital signals representing said on-screen display graphics information derived from said data representing said on-screen display graphics information which has been compressed and said digital signals representing said additional on-screen display graphics information derived from said data representing said additional on-screen display graphics information but which has not been compressed are contemporaneously generated and thereafter combined by said combining means.

4. The system recited in claim 3, wherein:

said data representing said additional on-screen display graphics information but which has not been compressed represents on-screen display graphics in the form of a bit-map.

5. The system recited in claim 1, wherein:

said data representing said on-screen display graphics information which has been compressed represents animation.

6. The system recited in claim 1, wherein:

said received stream of television video and audio packets is received from a transmission site.

7. The system recited in claim 1, wherein:

said received digital stream of television video and audio packets is received from a playback device.

8. The system recited in claim 1, further including:

means for coupling said digital signals representing said decompressed video information and said digital signals representing on-screen display graphics data to an image reproducing device; and means for coupling said digital signals representing said decompressed audio information to a sound reproducing device.

9. A method of providing on-screen display information in a television system for processing a received stream of packets representing television video and audio information which has been compressed and digitally encoded, each of said packets including payload data representing a particular type of information and a header which identifies the particular type of information represented by the payload data, including means for decoding and decompressing said received payload data representing television video information which has been compressed and digitally encoded to produce digital signals representing decompressed video information; means for decompressing said received payload data representing television audio information which has been compressed and digitally encoded to produce digital signals representing decompressed audio information; means for routing payload data of said packets of said stream of packets to ones of said decompressing means according to the respective headers contained in said packets; said method comprising the steps of:

retrieving data representing on-screen display graphics information which has been compressed and digitally encoded in the same manner as said video information from a memory; and selectively coupling said retrieved data representing on-screen display graphics information which has been compressed to said routing means so that said data representing said on-screen display graphics information which has been compressed is thereafter routed by said routing means to said video decompressing means where it is decompressed to form digital signals representing on-screen display graphics information derived from said data representing said on-screen display graphics information which has been compressed and digitally encoded in the same manner as said television video information.

10. The method recited in claim 9, further including the steps of:

retrieving data representing additional on-screen display graphics information but which has not been compressed in the same manner as said television video information from a memory;

converting said data representing said additional on-screen display graphics information but which has not been compressed to digital signals representing said additional on-screen display graphics information;

combining said digital signals representing said additional on-screen display graphics information derived from said data representing said additional on-screen display graphics information but which has not been compressed with said digital signals representing said on-screen display graphics information derived from said data representing said on-screen display graphics information which has been compressed.

11. The method recited in claim 9, wherein:

said data representing said on-screen display graphics information which has been compressed represents animation.

12. The method recited in claim 10, wherein:

said data representing said on-screen display graphics information which has been compressed represents animation; and said data representing said additional on-screen display graphics information but which has not been compressed represents static graphics information.

13. The system recited in claim 3, wherein:

said data representing said on-screen display graphics information which has been compressed represents animation; and said data representing said additional on-screen display graphics information but which has not been compressed represents static graphics information.

\* \* \* \* \*